(12) United States Patent
Pepe

(10) Patent No.: US 7,497,477 B2
(45) Date of Patent: Mar. 3, 2009

(54) PULL TAB VERIFIER ASSEMBLY FOR QUICK CONNECTORS

(75) Inventor: Richard M. Pepe, Macomb, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 377 days.

(21) Appl. No.: 11/440,753

(22) Filed: May 25, 2006

(65) Prior Publication Data

US 2006/0285917 A1   Dec. 21, 2006

Related U.S. Application Data

(60) Provisional application No. 60/690,965, filed on Jun. 15, 2005.

(51) Int. Cl.
*F16L 35/00* (2006.01)

(52) U.S. Cl. ............................ 285/93; 285/319; 29/407.1

(58) Field of Classification Search ................... 285/93, 285/319, 3; 29/890.14, 407.04, 407.1, 282
See application file for complete search history.

(56) References Cited

U.S. PATENT DOCUMENTS

| | | | | |
|---|---|---|---|---|
| 4,946,205 | A * | 8/1990 | Washizu | 285/319 |
| 5,152,555 | A * | 10/1992 | Szabo | 285/93 |
| 5,178,424 | A * | 1/1993 | Klinger | 285/319 |
| 5,441,313 | A * | 8/1995 | Kalahasthy | 285/93 |
| 5,542,712 | A * | 8/1996 | Klinger et al. | 285/93 |
| 5,593,187 | A | 1/1997 | Okuda et al. | |
| 5,863,077 | A * | 1/1999 | Szabo et al. | 285/3 |
| 5,893,590 | A * | 4/1999 | Klinger et al. | 285/319 |
| 5,897,145 | A * | 4/1999 | Kondo et al. | 285/93 |
| 6,129,393 | A * | 10/2000 | Kodama et al. | 285/319 |
| 6,145,886 | A * | 11/2000 | Ohta et al. | 285/4 |
| 6,328,344 | B1 * | 12/2001 | Tozaki et al. | 285/93 |
| 6,722,703 | B2 * | 4/2004 | Takayanagi | 285/93 |
| 7,044,505 | B2 * | 5/2006 | Takayanagi | 285/93 |
| 7,328,922 | B2 * | 2/2008 | Takayanagi et al. | 285/308 |
| 7,390,029 | B2 * | 6/2008 | Matsubara | 285/321 |
| 7,401,818 | B2 * | 7/2008 | Takayanagi | 285/319 |

* cited by examiner

*Primary Examiner*—David E Bochna
(74) *Attorney, Agent, or Firm*—Leydig, Voit & Mayer, Ltd.

(57) ABSTRACT

A quick connector coupling comprising a hollow female connector body, a male member having an enlarged annular upset received in the connector body, and a retainer releasably securing the male member in the connector body. A two piece insertion verifier assembly has a clip and a pull member connected together. The clip is attached to the connector body. The clip further includes a flexible cross member joining the two legs. The cross member includes an asymmetric tab, offset from its center toward one of the legs. The body has a protrusion on an outer surface. The tab and the protrusion insure proper orientation of the clip relative to the connector body and tube. With the upset secured by the retainer, it contacts the two legs of the clip to deform the legs apart to permit the clip to disengage from the connector body. However, the pull member and clip separate if a pulling force is exerted on the pull member with the male member not fully inserted into the connector body. The clip remains on the connector body.

49 Claims, 12 Drawing Sheets

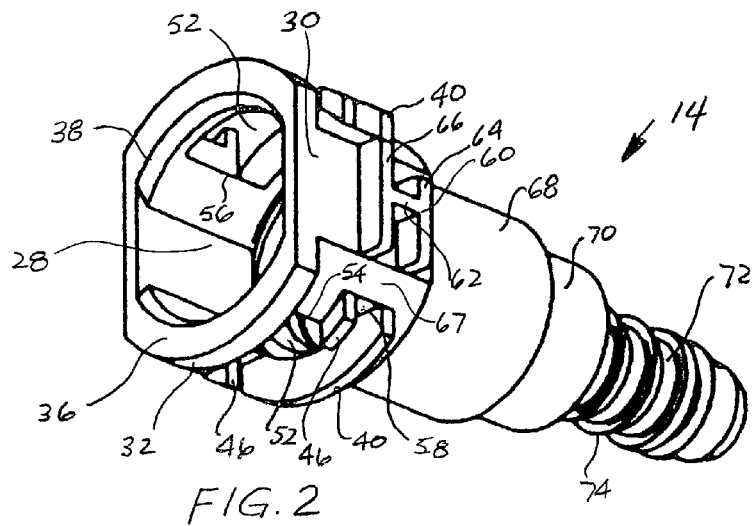
FIG. 2
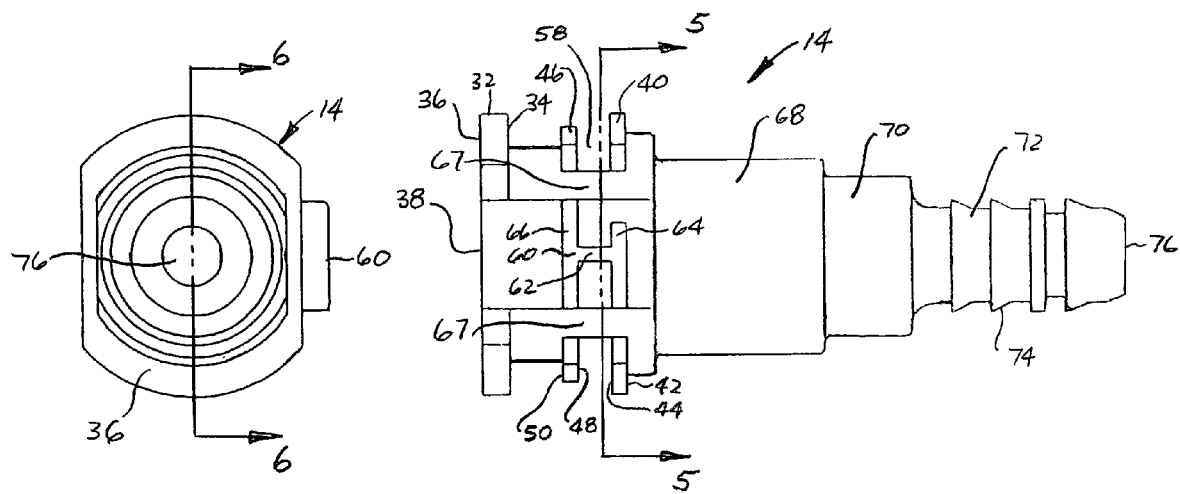
FIG. 3
FIG. 4

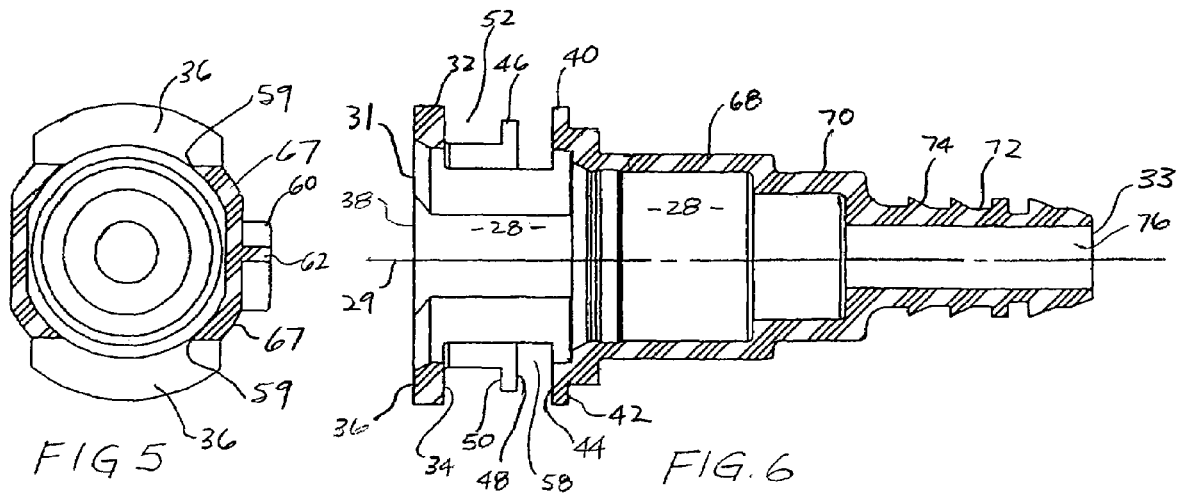
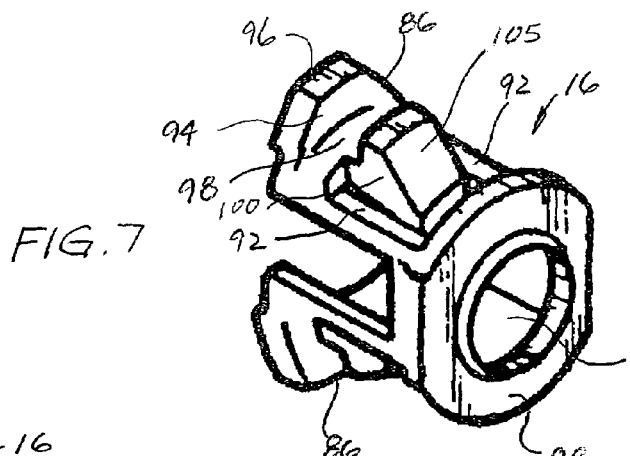
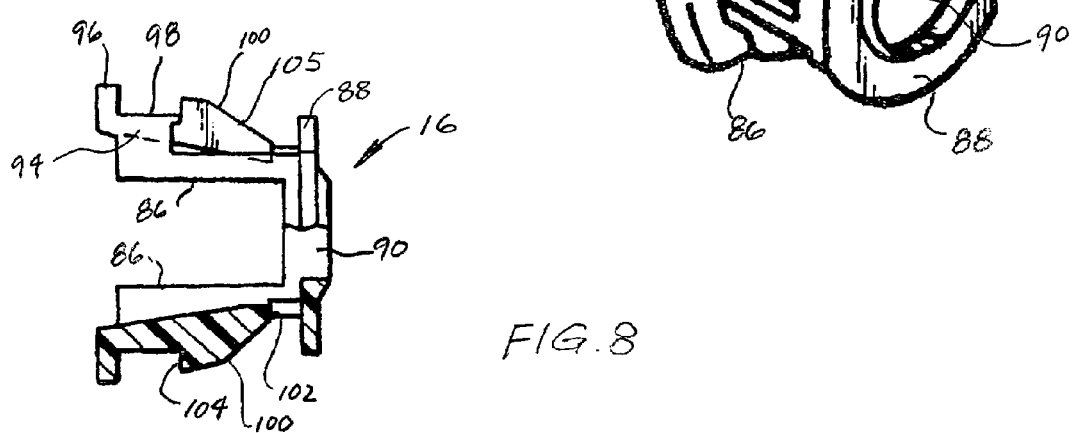

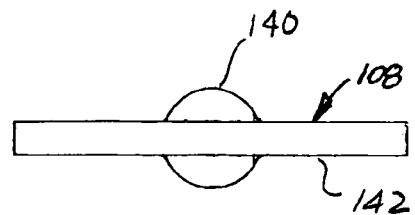
FIG. 14
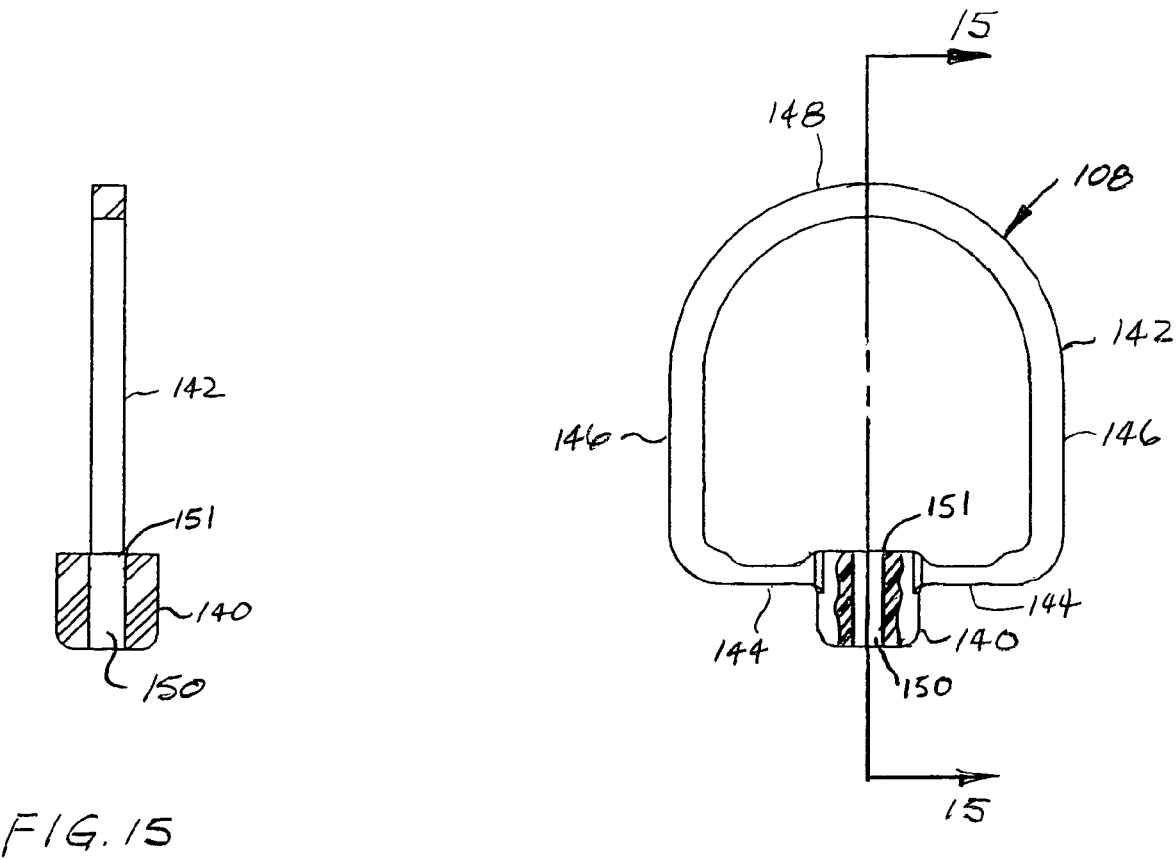
FIG. 15
FIG. 13

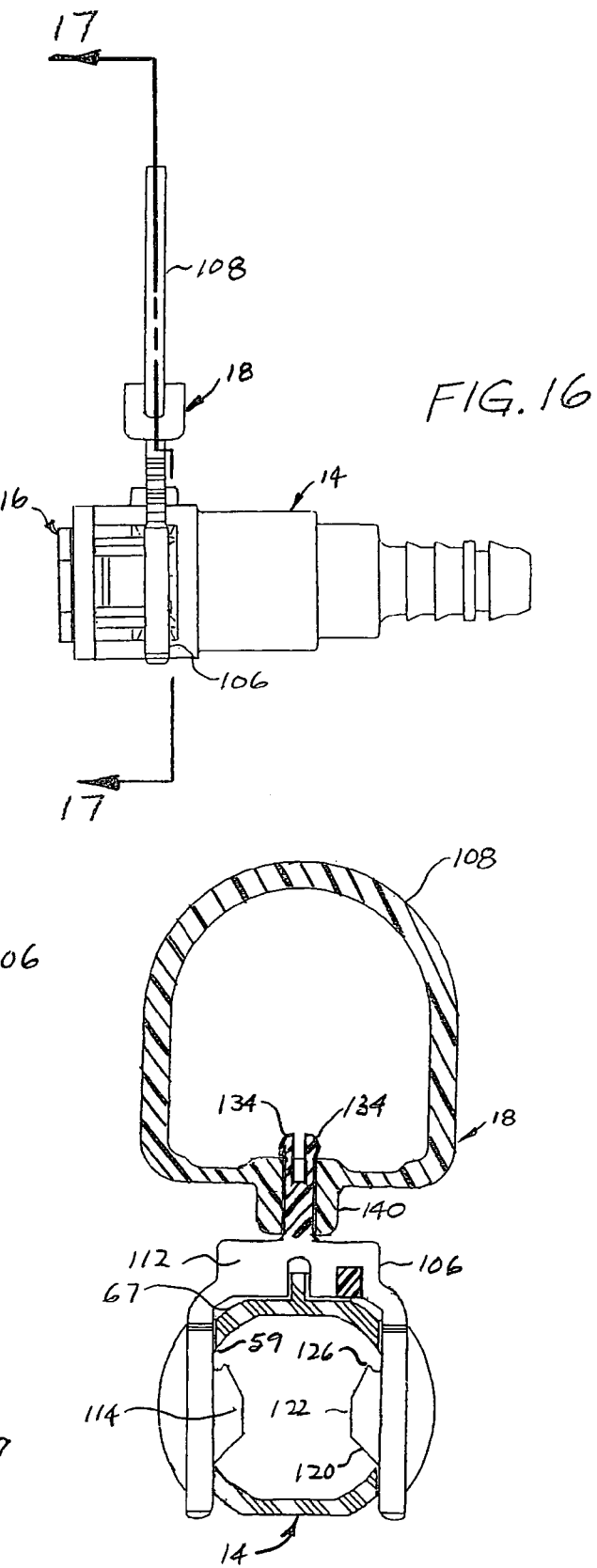

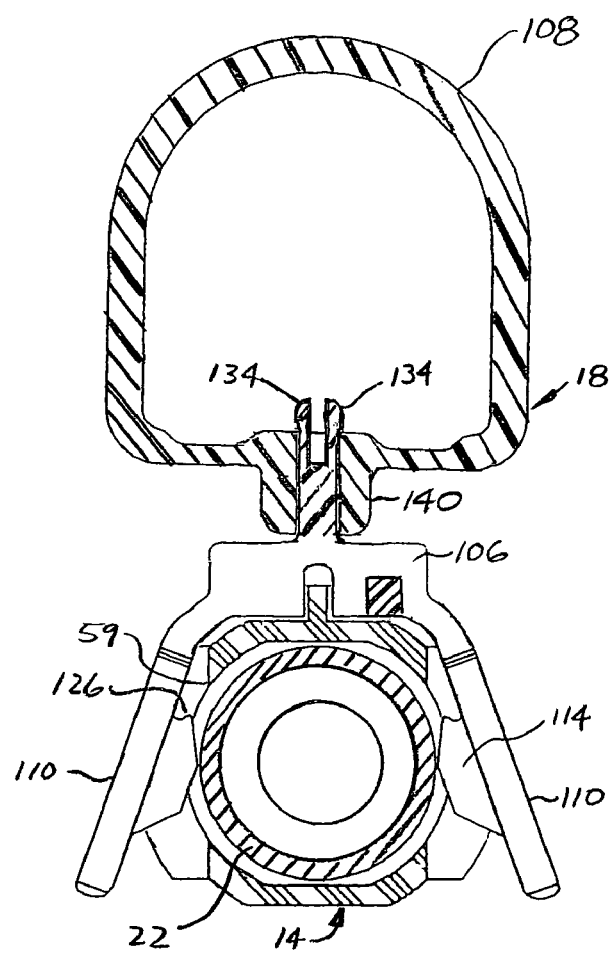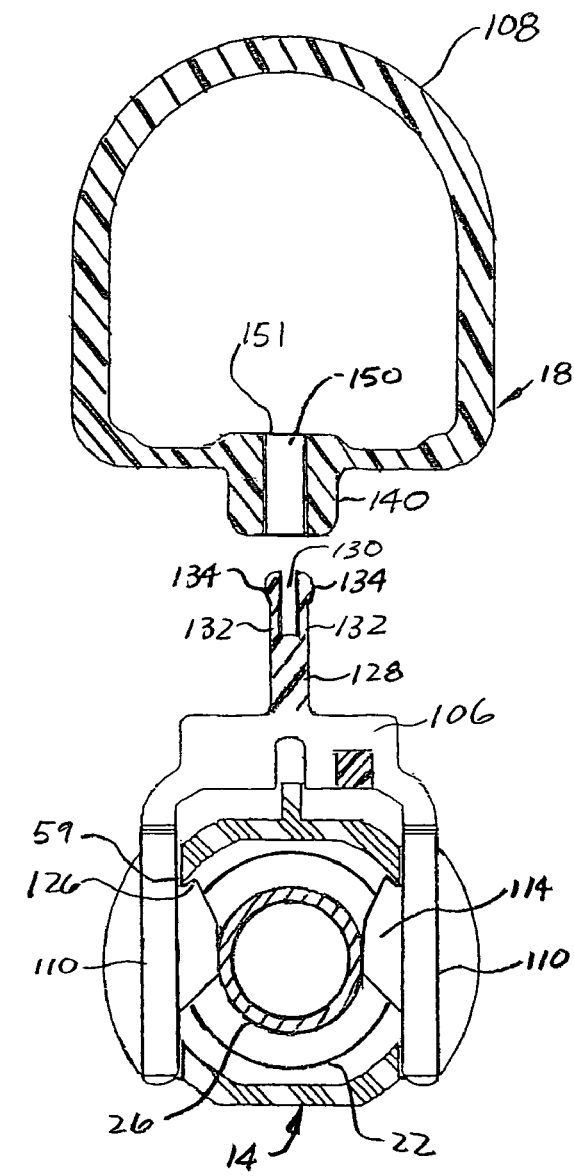
FIG. 19
FIG. 20

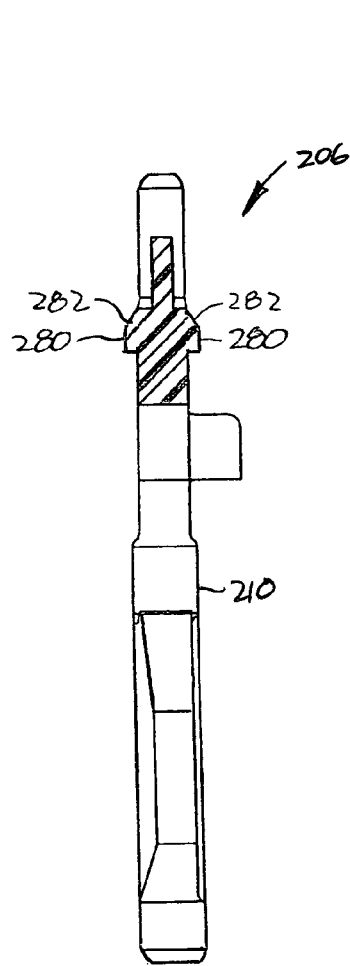
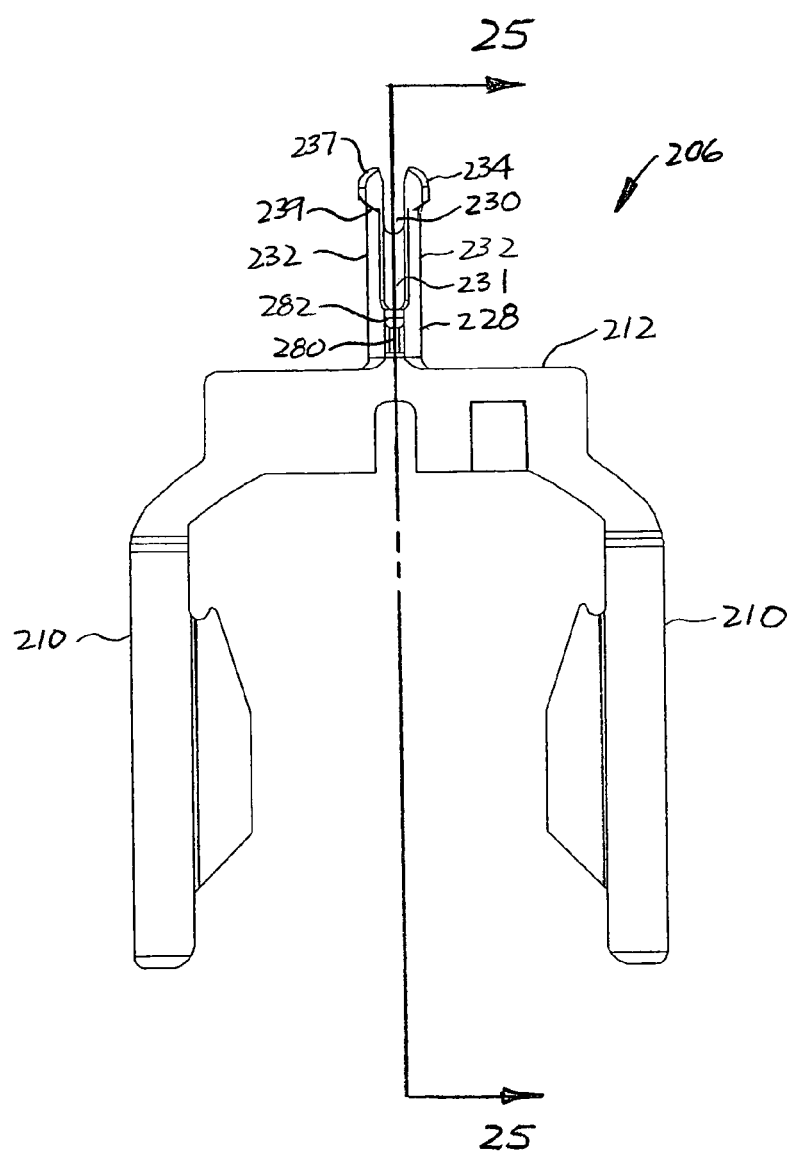
FIG. 25
FIG. 24

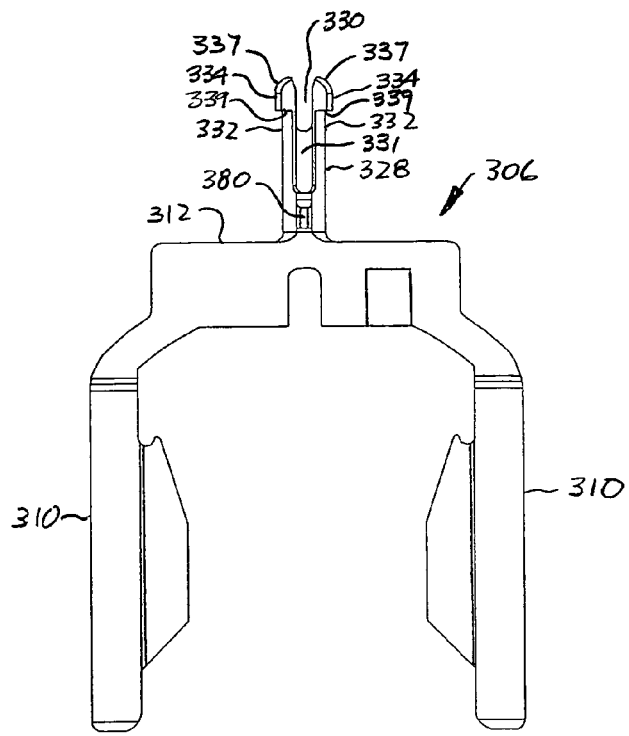
FIG. 28
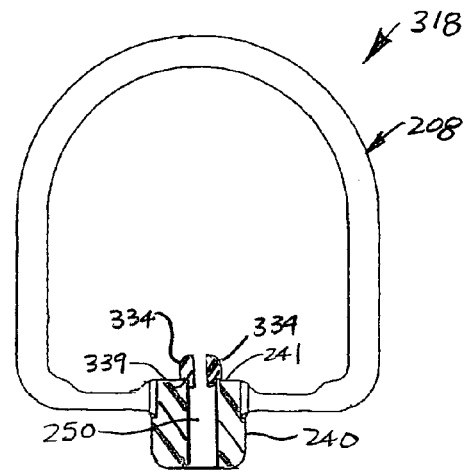
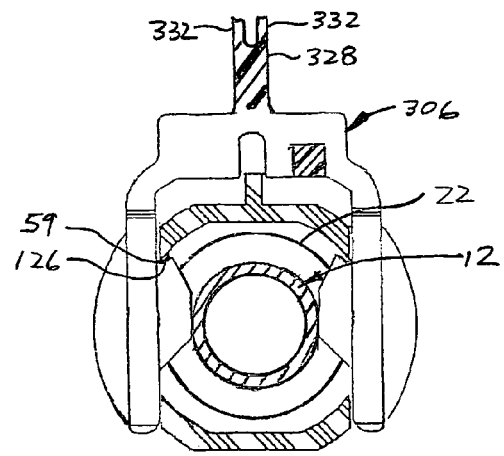
FIG 30
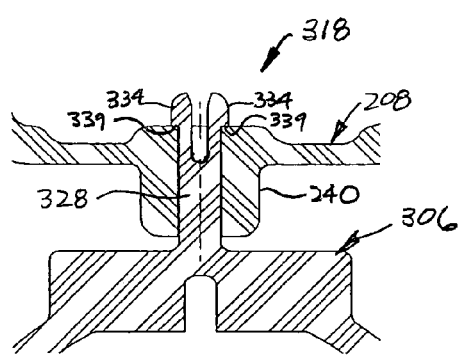
FIG. 29

PULL TAB VERIFIER ASSEMBLY FOR QUICK CONNECTORS

This application claims priority pursuant to 35 U.S.C. §120 to U.S. Provisional Application No. 60/690,965, filed Jun. 15, 2005.

BACKGROUND OF THE INVENTION

This invention relates to fluid line systems which include quick connector couplings, and more particularly to a quick connector coupling having a pull tab tube insertion verifier to provide a tactile and visual indication that a proper connection has been made between the male and female portions of the quick connector coupling.

In automotive and other fields, quick connector couplings, which generally include a male member received and retained in a female connector body in a fluid tight relation, are often utilized to provide a fluid connection between two components or conduits, thus establishing a fluid line between the two components. Use of quick connector couplings is advantageous in that a sealed and secured fluid line may be established with minimum amount of time and expense.

A retainer, housed within the female connector body, secures the male member within the connector body. One such type of retainer includes a plurality of locking beams which extend between a radial upset formed on the male member and a radial face defined in the connector body, preventing withdrawal of the male member from the connector body. This type of retainer is prevalent in the art and has proven effective in many fluid line applications.

An improper or incomplete connection between the male member and female connector body of a quick connector coupling is an unwanted condition. A leak in the fluid system will occur at the site. Potentially dangerous consequences can result if the fluid is pressurized and flammable. Thus, a reliable and accurate means for verifying that a proper connection has been established between the male member and female connector body is desirable.

One way to check for a proper connection is to physically tug or pull on the male member in a direction away from the connector body. An improper connection is obvious if the male member withdraws from the female connector body.

Reliance on this method of connection verification has numerous disadvantages. The pulling or tugging force exerted on the male member to check for a proper connection may be insufficient to withdraw a partially connected male member from the connector body, leading to an erroneous perception of a proper connection. Another problem associated with sole reliance on physical inspection is that no indication or verification is left behind to signal to others that the coupling has in fact been inspected and has been found to be proper. Also the physical placement of the connector may make this approach impractical.

It is sometimes possible to audibly verify a proper connection. Typically, as the male member is inserted into the female connector body, an audible "click" is heard when the male member locks into place. The click results from resilient retention beams of a retainer contained within the female connector body snapping into place behind an enlarged diameter upset portion formed on the male member. This method of verification is also deficient in several respects. The click may be very quiet or inaudible, making its detection difficult. The material from which the retainer is manufactured may affect the audibility of the resulting click. Background noise in the workplace can make the task even more difficult. And, of course, an audio method of verification is inherently limited by the installer's hearing perception.

A common type of tactile or visual connection indicator is a pull tab insertion verifier. Examples of this type of visual insertion verifier are disclosed in U.S. Pat. No. 4,946,205 to Washizu, U.S. Pat. No. 5,152,555 to Szabo and U.S. Pat. No. 5,897,145 to Kondo et al. These prior art pull tab verifiers typically include a handle and two legs each having a latch to engage a corresponding seat defined on the female connector body. With the male member fully inserted into the female connector body, the upset of the male connector body contacts the latches of the pull tab verifier to spread the legs outward from the seats of the connector body allowing the pull tab verifier to be easily pulled from the remainder of the quick connector coupling. The removal of the pull tab from the remainder of the quick connector coupling provides a tactile and visual indication that the male member has been fully connected to the female connector.

However, these prior art pull tab verifiers may provide a false indication that the male member has been fully inserted into the female connector body if the pull tab verifier was pulled with sufficient force to move the latches out of their seats, even though the male member has not been fully inserted into the female connector body. U.S. Pat. No. 6,145,886 to Ohta et al. addressed this false indication by forming the handle with notches which decrease the wall thickness at a portion of handle. When the handle is pulled with sufficient force and the male member has not been fully inserted into the female connection, the handle will break off at the notches rather than the latches moving out of their seats. Such pull tab verifier sometimes break at the notches before the intended insertion, preventing the verifier to serve its intended purpose.

The arrangement of the present invention provides the benefit of assuring that the male member has been fully inserted into the female connector before the pull tab verifier assembly can be pulled from the remainder of the quick connector coupling while reducing unintentional separation of the handle. The arrangement of the present invention may also allow for reattachment of the handle should it be intentionally or unintentionally separated from the remainder of the pull tab verifier assembly. The arrangement of the present invention further provides the benefit of assuring that ramped lead surface, defined on the latch, receives the male member upon insertion of the male member into the connector body. This allows for a ramped surface to be formed only on the side the latch that receives the male member; thus, provides for greater structure integrity, compared to a latch having ramped surfaces formed on both sides of the latch, to prevent bending of the latch relative to the leg upon insertion of the male member into the connector body.

BRIEF DESCRIPTION OF THE DRAWING

FIG. 2 is a perspective view of a female connector body of the quick connector coupling of FIG. 1.

FIG. 3 is front view of the female connector body of FIG. 2.

FIG. 4 is a side view of the female connector body of FIG. 2.

FIG. 5 is a sectional front view of the female connector body of FIG. 4 taken along line 5-5.

FIG. 6 is a sectional side view of the female connector body of FIG. 3 taken along line 6-6.

FIG. 7 is a perspective view of a retainer of the quick connector coupling of FIG. 1.

FIG. 8 is partial sectional side view of the retainer of FIG. 7.

FIG. 13 is a partial sectional rear view of a pull member of a pull tab verifier assembly of the quick connector coupling of FIG. 1.

FIG. 14 is a top view of the pull member of FIG. 13.

FIG. 15 is a sectional side view of the pull member of FIG. 13 taken along line 15-15.

FIG. 16 is a side view of the quick connector coupling of FIG. 1 after the retainer and the pull tab verifier assembly have been assembled with the female connector body.

FIG. 17 is sectional rear view of the quick connector coupling of FIG. 16 taken along line 17-17, with the retainer removed for clarity.

FIG. 18 is a fragmentary sectional view on an enlarged scale illustrating detail of the embodiment of the invention.

FIG. 19 is a sectional rear view similar to FIG. 17, with the retainer removed for clarity, showing the male member fully inserted into the female connector body.

FIG. 20 is a sectional rear view similar to FIG. 17, with the retainer removed for clarity, showing the pull member separated from the clip if the male member is not fully inserted into the female connector body.

FIG. 24 is a rear view of a clip of the pull tab verifier assembly of FIG. 22.

FIG. 25 is a sectional side view of the clip of FIG. 24, taken along line 25-25.

FIG. 28 is rear view of a clip of a second alternative pull tab verifier assembly according to the present invention.

FIG. 29 is a fragmentary sectional view on an enlarged scale illustrating detail of the second alternative pull tab verifier assembly according to the present invention.

FIG. 30 is a sectional rear view taken along a line similar to line 17-17 of FIG. 16, of a pull tab verifier assembly using the clip of FIG. 28, with the retainer removed for clarity, showing the post of the clip broken if the male member is not fully inserted into the female connector body.

DETAILED DESCRIPTION OF ILLUSTRATED EMBODIMENT

Figure 1:
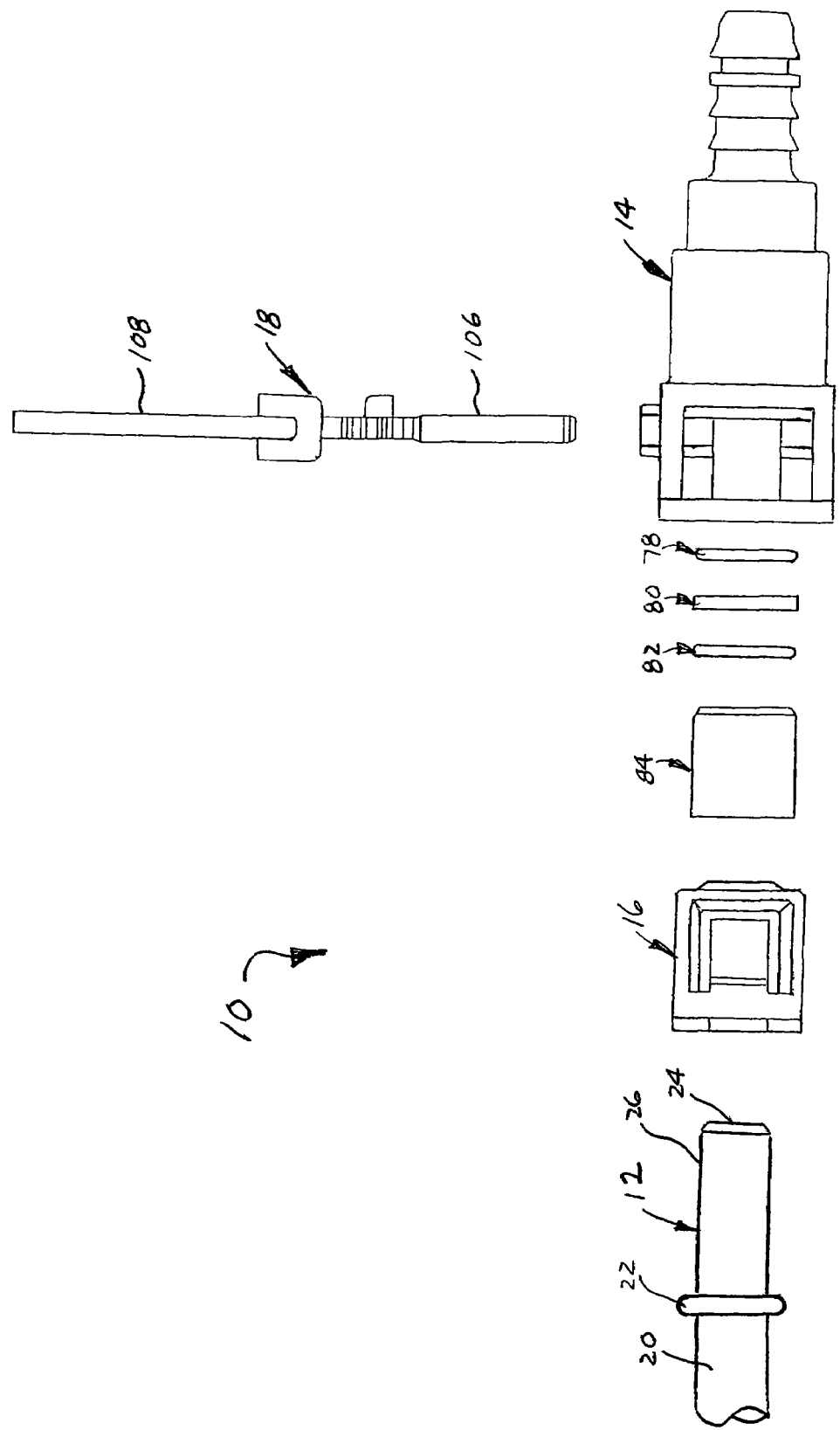
FIG. 1 is an exploded side view of a quick connector coupling according to the present invention.

A quick connector coupling 10 in accordance with the present invention is illustrated in FIG. 1. The quick connector coupling 10 comprises a tubular male member 12, a hollow female connector body 14, a retainer 16 for securing the male member 12 within the connector body 14, and a pull tab verifier assembly 18.

The male member 12 is formed at an end of a hollow, rigid tube 20 which forms a part of a fluid line system. The tube 20 on which the male member 12 is formed may lead to a component in a fluid line system or may itself be a component in a fluid line system. The male member 12 includes a radially enlarged annular flange or upset 22 formed a given distance from an end 24. The end 24 is rounded or tapered to facilitate insertion of the male member 12 into the connector body 14. A smooth, cylindrical sealing portion 26 extends between the upset 22 and the end 24. The sealing portion 26 is formed by the outer surface of the tube and has a diameter approximately equal to the diameter of the tube 20.

The female connector body is illustrated in detail in FIGS. 2-6. It is preferably made of a plastic material, such as nylon 12. The female connector body 14 is hollow and defines a bore 28 centered about a longitudinal axis 29, as illustrated in FIG. 6. It should be noted that the term axial and axially as used herein means longitudinally along the axis 29. The term lateral, laterally, transverse and transversely mean in a plane generally perpendicular to the axis 29 toward and away from the axis. The bore 28 of the connector body 14 extends completely through the connector body from a larger diameter male member reception end 31 to a smaller diameter hose connection end 33.

An enlarged retainer housing portion 30 is formed at the male member reception end 31 of the connector body 14. The retainer housing portion 30 includes an entrance rim 32 having a rearward facing surface 34 and a forward facing surface 36. The entrance rim 32 defines an entrance opening 38 to the bore 28. It should be noted that the term rearward is used herein to mean in a direction axially from the male member reception end 31 toward the hose connection end 33 generally along the axis 29. The term forward means in a direction axially from the hose connection end 33 toward the male member reception end 31 generally along the central axis 29.

The retainer housing portion 30 further includes two rear guide rims 40, approximately one-hundred and eighty (180) degree apart, and four front guide rims 46. Each rear guide rim 40 has a rearward facing surface 42 and a forward facing surface 44. Each front guide rim 46 has a rearward facing surface 48 and a forward facing surface 50.

A pair of rectangular windows 52 displaced circumferentially are formed through the connector body 14. Each window 52 is defined by the rearward facing surface 34 of the entrance rim 32, the forward facing surface 44 of a corresponding rear guide rim 40, a top edge 54 and a bottom edge 56, as illustrated in FIG. 2. Four pull tab guide slots 58 are defined by the forward facing surfaces 44 of the rear guide rims 40 and the rearward facing surfaces 48 of the front guide rims 46. Two of the pull tab guide slots 58 are in-line with each other. The other two in-line pull tab guide slots 58 are approximately one-hundred and eight (180) degree circumferentially displaced. Since each window 52 is defined by the rear guide rim 40; the rear portion of the window 52 is located in between two in-line pull tab guide slots 58. The top edge 54 immediately below the top pull tab guide slot 58 is a seat 59 for receiving a hook of the pull tab verifier assembly as will be explained.

It should be noted that for purpose of clarity, the quick connector coupling 10 is shown with its longitudinal extent positioned in a horizontal plane and the terms "top," "bottom" and "side" have been used in describing the connector body 14. It will become understood that the "top" configuration is associated with the pull tab verifier assembly 18. However, in use, the connector coupling 10 can reside in any orientation without regard to the horizontal and vertical planes and "top" and "bottom" are only relevant to the illustration herein.

As illustrated in FIGS. 2 and 4, a truncated H-shaped protrusion 60 extends upward from the top outer surface of the retainer housing portion 30. The protrusion 60 is spaced circumferentially approximately ninety (90) degrees from the windows 52. The protrusion 60 includes a central beam portion 62 and lateral beam portions 64 and 66 integral with the central beam portion 62. The rear lateral beam portion 64 is truncated to accommodate an alignment tab extending from the pull tab verifier assembly 18 as will be explained. The retainer housing portion 30 of the connector body 14 includes two chamfered surfaces 67 each located circumferentially between the protrusion 60 and one of pull tab guide slots 58.

The connector body 14 further includes a seal housing portion 68, a tube receiving portion 70 and a stem 72 at the hose connection end 33 of the connector body 14, opposite the entrance 38. Barbs 74 are formed on the exterior of the stem 72 to facilitate connection of the connector body 14 to a flexible tubing (not shown). The stem 72 defines an opening 76 to provide communication with the flexible tubing.

An rearward O-ring seal 78, a spacer 80 and a forward O-ring seal 82 are disposed within the seal housing portion 68 of connector body 14. The O-rings 78, 82 and the spacer 80 are illustrated in FIG. 1. The O-rings 78 and 82 are sized to fit tightly within the bore 28 and tightly around the sealing portion 26 of the male member 12. The O-rings 78, 82 and the spacer 80 are positioned and secured in the bore 28 by a sleeve 84. The sleeve 84 is preferably made of a rigid plastic material. While the illustrated embodiment discloses two O-rings 78, 82 to form a fluid seal between the male member 12 and the connector body 14; a single O-ring, in place of the two O-rings and spacer, can also be used to form the fluid seal between a male member and a connector body.

The retainer 16 is disposed in the retainer housing portion 30 of the connector body 14, adjacent the entrance 38, to secure the male member 12 within the connector body 14. The retainer 16 is preferably made of plastic, such as nylon 6-12. The retainer 16 includes two locking members 86 extending axially from a base ring 88. The base ring 88 is slidably mounted on the sealing portion 26 of the male member 12. The base ring 88 defines a central annular opening 90 with a diameter slightly greater than the outer diameter of male member sealing portion 26, but less than the diameter of male member upset 22. Thus, the sealing portion 26 of the male member 12 can pass through the base ring 88, but the upset 22 cannot.

The locking members 86 are integrally joined to and extend axially from the base ring 88. Each locking member 86 includes two parallel support beams 92 extending from base ring 88. The two support beams 92 are joined at their ends distal from the base ring 88 by a cross beam 94. The cross beam 94 includes a finger release tab 96 and a groove 98 adapted to receive the entrance rim 32 of the connector body 14. The radial spacing between the two cross beams 94 is greater than the outside diameter of the upset 22. Hence, the male member 12, upset 22 and all, can pass between the cross beams 94 without resistance.

A retention beam 100 is centrally mounted on each cross beam 94 and straddled by the support beams 92 of the locking member 86. Each retention beam 100 extends from the cross beam 94 at a radially inward converging angle, terminating in an upset abutting surface 102. The upset abutting surface 102 is adapted to be in an abutting relationship with the male member upset 22 after the male member 12 has been fully inserted into the female connector body 14. The axial separation between the upset abutting surface 102 and the base ring 88 must be at least as great as the axial width of upset 22. The radial spacing between the upset abutting surfaces 102 of the two retention beams 100 is less than the diameter of male member upset 22. Thus, the retention beams 100 must be forced radially outward to permit passage of upset 22. Each retention beam 100 further includes a connector body abutting surface 104. The connector body abutting surface 104 is adapted to be in an abutting relationship with the rearward facing surface 34 of the entrance rim 32 after the retainer 16 has been fully inserted into the connector body 14. Located axially in between the upset abutting surface 102 and the connector body abutting surface 104 is a sloped outer surface 105. The sloped outer surface 105 is sloped radially inward toward the upset abutting surface 102.

In accordance with the present invention, the tube insertion verifier takes the form of a pull tab verifier assembly 18. It includes a clip 106 and a separate pull member 108 connected or releasably secured to the clip 106.

Figure 9:
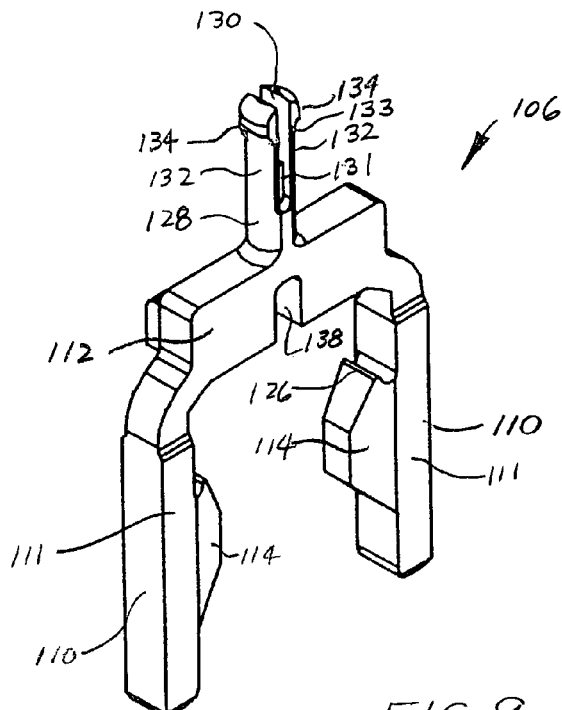
FIG. 9 is a perspective view of a clip of a pull tab verifier assembly of the quick connector coupling of FIG. 1.
Figure 10:
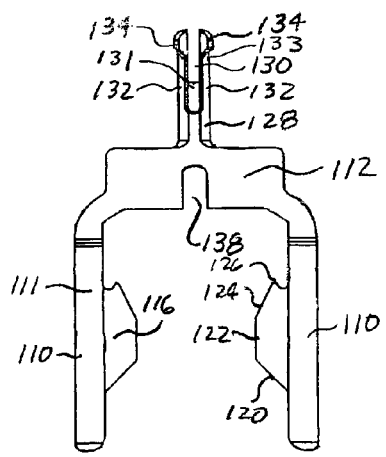
FIG. 10 is a front view of the clip of FIG. 9.
Figure 12:
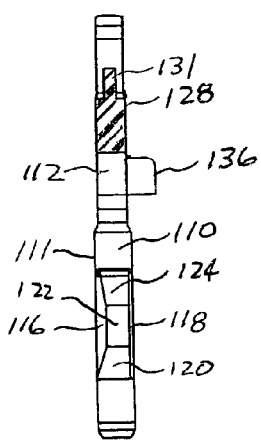
FIG. 12 is a sectional side view of the clip of FIG. 11 taken along line 12-12.
Figure 11:
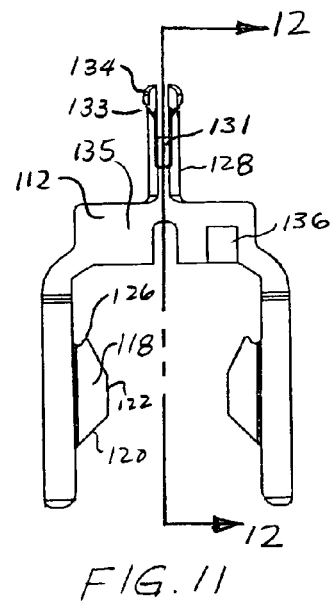
FIG. 11 is a rear view of the clip of FIG. 9.

The clip 106 is illustrated in detail in FIGS. 9-12. The clip 106 includes a pair of elongated, generally parallel legs 110 extending from, and joined at one end, by a cross member 112. The legs 110 have a thickness slight smaller than the width of the pull tab guide slots 58 defined by the rear guide rims 40 and the front guide rims 46. Each leg 110 includes a forward facing surface 111. A pair of latches 114 extend from the inner surfaces of the legs in the direction of the other latch. As illustrated in FIGS. 9 and 12, each latch 114 has a ramped lead surface 116 sloped radially outward and axially rearward from the forward facing surface 111 of the leg 110. Each latch 114 also has a non-ramped planar surface 118, approximately parallel to a plane defined by the forward facing surfaces 111 of the legs 110 and approximately perpendicular to the axis of connector body 14 after the pull tab verifier assembly 18 has been attached to the connector body. The planar surface 118 faces the rear of the clip 106. Each latch 114 further has a sloped bottom edge 120, a tube engagement edge 122, a sloped top edge 124 and an upwardly extending hook 126.

A cylindrical post 128, having finger portions 132, extends upward from the top of the cross member 112 and defines a slot 130 extending a distance, or length, downward from the top or free end of the post 128. The slot 130 allows the two elongated finger portions 132 of the post 128 to flex inward toward each other on application of radially inward force allowing the post 128 to define a smaller diameter. The post 128 further includes a web 131, having a length significantly less than the length of the slot 130, connecting parts of finger portions 132 to each other. The web 131 concentrates the flexibility of the finger portions 132 toward each other. The top of each finger portions 132 includes radially enlarged rim 134 extending radially outward from each finger portions 132. The top of the rim 134 defines a rounded upper engagement surface 137. The bottom of the rim 134 defines a rounded lower engagement surface 139. Alternatively, the upper engagement surface 137 and/or the lower engagement surface 139 can be tapered. The rounded or tapered shape of the upper engagement surface 137 allows a radially inward force to be created, flexing the finger portions 132 inward toward each other, when the post 128 is being inserted into a hole of the pull member 108. The rounded or tapered shape of the lower engagement surface 139 allows a radially inward force to be created, flexing the finger portions 132 inward toward each other, when a pulling force is exerted on the pull member 108. When the finger portions 132 are flexed toward each other, the perimeter around the rim 134 is smaller than the perimeter when no force is applied and permit the pull member 108 to separate from the clip 106 as will be explained.

The clip 106 further includes an alignment tab 136 extending rearward from the rearward facing surface 135 of the clip 106 and is offset to one side of the clip 106 toward one of the legs 110. The alignment tab 136 is positioned and sized to be spaced from and fit at the end of the truncated lateral beam portion 64 of the protrusion 60 extending from the top surface of the connector body 14, but hits or contacts the top of the full lateral beam portion 66 if the clip is installed one hundred and eighty (180) degrees, preventing further movement of the pull tab verifier assembly 18 radially inward toward the connector body 14. This relationship of the alignment tab 136 only able to fit at the end of the truncated lateral beam portion 64 assures that the clip 106 is properly attached to the connector body 14, such that the ramped lead surface 116 is facing the entrance 38 of the connector body 14. A notch 138 is defined at the bottom of the cross member 112. The notch 138 is positioned and sized to allow the central beam portion 62 of the protrusion 60 to fit therein upon clip properly attached to the connector body 14.

The pull member 108 is illustrated in detail in FIGS. 13-15. The pull member 108 is releasably secured to the clip 106, such that if the pull member 108 is pulled with a force greater than what is necessary for the pull tab verifier assembly 18 to be pulled from the connector body 14 when the male member 12 is fully inserted into the female connector body 14, the pull member 108 will separate from the clip 106. The pull member 108 includes a base 140 and a ring 142 extending from the base 140. The ring includes two horizontal columns 144, two vertical columns 146 and a semi-circle shaped arch 148. The thickness of the horizontal columns 144 is less than the thickness of the vertical columns 146. The base 140 defines a hole 150 extending downwardly from an opening 151 on the top surface 141 of the base 140. The hole 150 is sized such that it is smaller than the outer diameter of rim 134 of the post 128 when the two finger portions 132 of the post are in the unflexed state, and the hole 150 is larger than the outer diameter of the rim 134 when the two finger portions 132 of the post 128 are flexed inward.

Prior to insertion of the male member 12 into the connector body 14; the retainer 16 and the pull tab verifier assembly 18 are assembled into and onto, respectively, the connector body 14. After the O-rings 78 and 82, the spacer 80 and the sleeve 84 have been inserted into the bore 22, the retainer 16 is installed into the connector body. In installing the retainer 16, since the outside diameter of the retention beams 100 is greater than the inside diameter of the entrance rim 32, the locking members 86 must be flexed inward to clear the entrance rim 32. This flexure of the locking members 86 is facilitated as the sloped outer surfaces of the retention beams 100 slide or cam against the entrance rim 32 during insertion of the retainer 16 into the connector body 14. Pressing the release tabs 96 radially inward may also be utilized to assist in the clearance of retention beams 100. Once the retention beams 100 clear the entrance rim 32, the locking members 86 snap radially outward to secure the retainer 16 in the connector body 14. In the secured position, the entrance rim 32 of the connector body 14 is situated in the groove 98 of the retainer 16, such that the forward facing surface 36 of the entrance rim 32 is in abutting relationship with the release tab 96 and the rearward facing surface 34 of the entrance rim 32 is in abutting relationship with the connector body abutting surface 104 to limit axial movement of the retainer 16 relative to the connector body 14. Also in the secured position, the retention beams 100 are situated in the windows 52 defined in the connector body 14.

Prior to assembling the pull tab verifier assembly 18 onto the connector body 14, the pull member 108 is secured to the clip 106 by inserting the post 128 of the clip 106 into the hole 150 defined in the base 140 of the pull member 108. As the post 128 is being inserted into the hole 150, the upper engagement surface 137 of the rim 134 of the post 128 contacts bottom surface of the base 140. Due to the rounded or tapered shape of the upper engagement surface 137, further insertion of the post 128 into the hole 150 creates radially inward forces on the two finger portions 137 of the post 132 causing the finger portions 132 to flex inward toward each other. With the two finger portions 132 of the post 128 flexed inward such that the diameter of the post 128 is smaller than the diameter of the hole 150, the post 128 can be inserted further through the hole 150 of the base 140. Once the rim 134 exceeds the base 140 of the clip 106, the two finger portions 132 of the post 128 snap outward away from each other to secure the pull member 108 to the clip 106. Since the rim 134 have a diameter greater than the diameter of the hole 150 when the two finger portions 132 of the post 128 are in the unflexed state, the top surface 141 of the base 140 immediately radially outward of the opening 151 is in abutting relationship the bottom engagement surface 139 of the rim 134. Thus, the pull member 108 cannot slide off the end of the post 128 unless sufficient pulling force is exerted to flex the two finger portions 132 of the post 128 inward.

After the pull member 108 has been slidably mounted to the post 128 of the clip 106 to releasably secure the pull member 108 to the clip 106, the pull tab verifier assembly 18 is assembled onto the connector body 14. To assemble the pull tab verifier assembly 18 onto the connector body 14, pull tab verifier assembly 18 is oriented with the legs 110 of the clip 106 approximately transverse with or perpendicular to the axis of the connector body 14 when viewed from the side and with each leg 110 aligned with corresponding in-line pull tab guide slots 58 defined on retainer housing portion 30 of the connector body 14.

The pull tab verifier assembly 18 is also oriented such that the ramped lead surfaces 116 of the legs 110 are facing the entrance 38 of the female connector body 14. This allows the male member 12 to contact the ramped lead surfaces 116 to spread the legs 110 outward upon insertion of the male member 12 into the connector body 14. To assure that the pull tab verifier assembly 18 is oriented with the ramped lead surfaces 116 facing the entrance 38, the alignment tab 136, protruding from the cross member 112, is located on the clip 106 such that it will contact the top surface of the non-truncated lateral beam portion 66 if the pull tab verifier assembly 18 is not installed with ramped lead surfaces 116 facing the entrance 38. If the pull tab verifier assembly 18 is properly installed, such that the ramped lead surfaces 116 face the entrance 38, the alignment tab 136 will be situated adjacent to the truncated lateral beam portion 64. The ability of the alignment tab 136 to be space from and fit next to the truncated later beam 64, rather than contacting the top of the full lateral beam portion 66, only if the ramped lead surfaces 116 face the entrance 38 provides a clear visual indication that pull tab verifier assembly 18 has been properly installed. Since the rear lateral beam portion 64 of the illustrative embodiment is truncated, the alignment tab 136 faces rearward, towards the truncated lateral beam portion 64 when installing the pull tab verifier assembly 18 of the illustrative embodiment onto the connector body. It should be noted that it remains within the spirit of the present invention to locate the alignment tab on other locations of the clip so long as the alignment tab is keyed with a corresponding portion of the connector body such that the pull tab verifier assembly can only be installed onto the connector body if the ramped lead surfaces are facing the entrance of the connector body.

Since the distance between the latches 114 of the legs 110 is less than the width of the outer surface of the retainer housing portion 30 defining the pull tab guide slots 58, the legs 110 of the clip 106 must flexed outward to clear the outer surface of the retainer housing portion 30 defining the pull tab guide slots 58. The sloped bottom edges 120 of the latches 114 slide or cam against the chamfered surfaces 67 of the retainer housing portion 30 to flex the legs 110 outward when the pull tab verifier assembly 18 is push downward toward the windows 52. After the latches 114 surpass the chamfered surfaces 67, each latch 114 is situated in a corresponding pull tab guide slot 58 located above the window 52. Once the latches 114 clear the top edges 54 defining the windows 52, the legs 110 snap inward into the windows 52 with each hook 126 positioned immediately beneath and engaging the corresponding seat 59 of the connector body 14, as illustrated in FIGS. 16 and 17. At the same time, the cross member 112 of the of the clip 106 is situated axially in between and in abutting relationship with the two lateral beam portions 64, 66 of the protrusion 60. Since the rear lateral beam portion 64 is truncated, the alignment tab 136 extending rearward from the rearward facing surface of the cross member 112 is able to be space from and fit next to the truncated lateral beam portion 64. With the cross member 112 of the clip 106 in abutting relationship with the two lateral beam portions 64, 66 and the legs 110 of the clip 106 in abutting relationship with the rearward and front guide rims 40, 50; the clip 106 is restrained axially relative to the connector body 14.

With the retainer 16 inserted into the connector body 14 and the pull tab verifier assembly 18 installed onto the connector body 14, the male member 12 is then inserted into the female connector body 14 to complete the coupling assembling process. The connection of the male member 12 with the female connector body 14 can be performed at the same facility soon after the retainer 16 and the pull tab verifier assembly 18 have been assembled into and onto the connector body 14. Alternatively the male member 12 can be connected with the female connector body 14 at a different facility, such as the assembly plant of an original equipment manufacturer (OEM).

Upon insertion of the male member 12 into the connector body 14, resistance to insertion of the male member 12 occurs when the upset 22 contacts the radially inner surfaces of the retention beams 100 of the retainer 16. Since the retention beams 100 are flexible about the cross beams 94, impartment of sufficient axial inward force to male member 12 causes the retention beams 100 to flex outward allowing the upset 22 to move axially inward until the upset surpasses the free ends of the retention beams 100. Once this occurs, the retention beams 100 snap radially inward with the upset abutting surface 102 in abutting relationship with the upset 22. With the upset 22 in abutting relationship with the upset abutting surface 102 at one axial end and in abutting relationship with the base ring 88 at the other axial end, the male member 12 is retained axially relative to the retainer 16 and likewise to the connector body 14. Hence, subsequent withdrawal of the male member 12 from the connector body is prevented.

Upon the male member 12 fully connected with the female connector body 14, such that the upset 22 is situated axially in between the upset abutting surface 102 and the base ring 88 of the retainer 16, the upset 22 of the male member 12 abuts the tube engagement edges 122 of the latches 144 to spread the legs 110 of the pull tab verifier assembly 18 outward, as illustrated in FIG. 19. As the legs 110 of the pull tab verifier assembly 18 are spread outward, each hook 126 clears its corresponding seat 59 allowing the pull tab verifier assembly 18 to be pulled upward to disengage verifier assembly 18 from the connector body 14, without much resistance. The successful removal of the pull tab verifier assembly 18 from the connector body 14 provides a visual indication that the male member 12 has been fully connected with the female connector body 14.

If the male member 12 has not been fully inserted into the female connector body 14, such that the male member 12 has not been sufficiently inserted axially inward into the connector body 14 to allow the upset 22 to surpass the free ends of the retention beams 100 of the retainer 16, the hooks 126 of the pull tab verifier assembly 18 remain immediately below and engaged with the corresponding seats 59, as illustrated in FIG. 20. As disclosed previously, when a pulling force is exerted on the pull member 108, the rounded or tapered shape of the lower engagement surface 139 allows a radially inward force to be created, flexing the finger portions 132 inward toward each other. Should the pull member 108 of the pull tab verifier assembly 18 be pulled with a force greater than the force necessary to disengage the pull tab verifier assembly 18 from the connector body 14 when the male member 12 has been fully inserted into the female connector body 14, the pulling force creates sufficient radially inward force to cause the two finger portions 132 of the post 128 to flex inward to a diameter smaller than the diameter of the hole 150 of the pull member 108. Further pulling force slides the pole of the clip 106 through the hole 150 of the pull member 108 to separate the pull member 108 from the clip 106.

A clip 106 attached to the connector body 14, without the pull member 108 secured to the post 128, provides a visual indication that the male member 12 has not been fully inserted into the female connector body 14. In such a situation, the pull member 108 can be reattached to the clip 106 by sliding the base 140 of the pull member 108 over the post 128 until the post is situated in the hole 150 defined in the base 140 and the rim 134 are located above the base 140. With the pull member 108 reattached to the clip 106, the male member 12 can be further inserted into the connector body 14 until the male member 12 has been fully inserted into the female connector body 14.

Alternatively, the coupling 10 of the present invention also permits the male member 12 to be first fully inserted into the female connector body 14 and then reattach the pull member 108 to the clip 106. Once the pull member 108 has been reattached to the clip 106 and the male member 12 has been further inserted into the connector body 14 until it is fully inserted into the connector body; the pull tab verifier assembly 18, with the pull member 108 reattached to the clip 106, can be detached from the connector body 14 by pulling on the pull tab verifier assembly 18 without much resistance to provide a visual indication that the male member 12 is now fully inserted into the connector body 14.

For the pull member 108 to properly separate from the clip 106 in the event that a pulling force is exerted on the pull member 108 when the male member 12 is not fully into the female connector body 14; the diameter of the rim 134 relative to the diameter of the hole 150, the width and length of the slot 130 defined between the post finger portions 132, the length and thickness of the web 131 and the flexibility of post finger portions 132 must be taken into consideration so that the pulling force required to separate the pull member 108 from the clip 106 must be greater than the force required to detach the pull tab verifier assembly 18 from the connector body 14 when the male member 12 has been fully inserted into the female connector body 14, but the pulling force required to separate the pull member 108 from the clip 106 must be less than the force required to unintentionally move the hooks 126 out of their seats 59 when the male member 12 has not been fully inserted into the female connector body 14.

As discussed previously, one of the advantages with the two piece pull tab verifier assembly 18 of the present invention is that the pull member 108 of the pull tab verifier assembly 18 can be reattached to the clip 106. This reattachable feature of the pull tab verifier assembly 18 is not only beneficially for reinsertion of the male member 12 into the connector body when the male member has not been fully inserted into the female connector body 14, it is also beneficial in situations in which the pull member 108 was accidentally pulled off before the male member 12 is ready to be inserted the connector body 14, such as during transport to the OEM's facility. In such a situation, the pull member 108 can be reattached to the clip 106 allowing the pull tab verifier assembly 18 to still serve its intended purpose.

Figure 21:
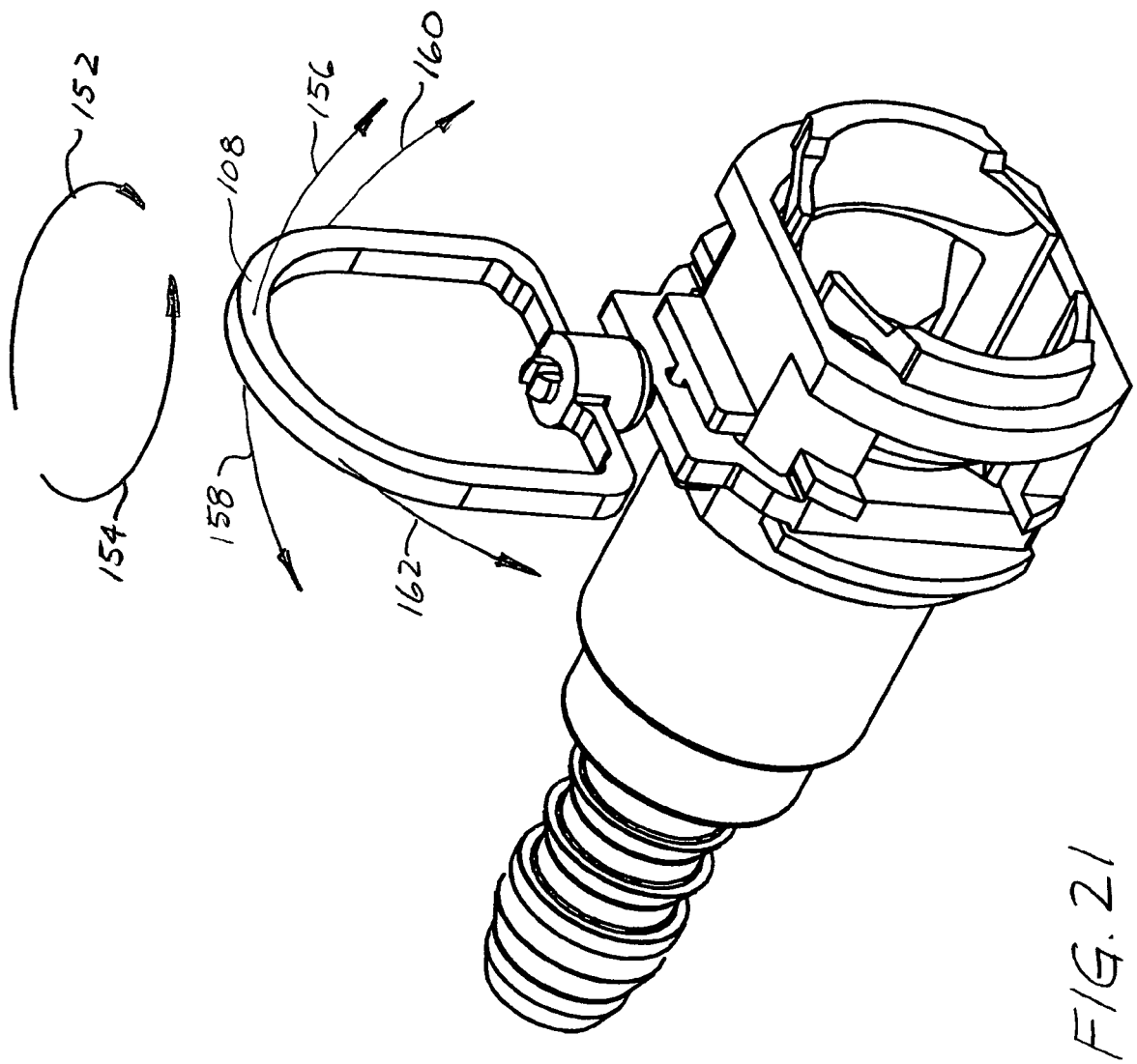
FIG. 21 is a perspective view of the quick connector coupling of FIG. 1 showing the flexibility of the pull member relative to the clip.

Another advantage the two piece pull tab verifier assembly 18 of the present invention has over the prior art one piece pull tab verifier assembly is that the pull member 108 is capable of spinning or rotating freely relative to the clip 106. This allows the pull member 108 to rotate at least three hundred and sixty (360) degrees freely relative to the clip 106 in either clockwise or counter-clockwise directions as indicated by arrows 152 and 154 in FIG. 21. With the pull member 108 capable of rotating freely relative to the clip 106, opportunities for unintentional separation of the pull member 108 from the clip 106 are greatly reduced. To further reduce accidental separation of the pull member 108 from the clip 106, the post 128 of the clip 106 and the ring 142 of the pull member 108 are designed to allow the pull member 108 and the post 128 to flex rear to back, as indicated by arrows 156 and 158, and side to side, 160 and 162, without unintentionally releasing the pull member 108 from the clip 106. Furthermore, as illustrated in FIG. 13, with the horizontal columns 144 of the ring 142 thinner than the vertical columns 146, the ring 142 is able to twist as it is flexing. The ability of the pull member 108 of the present invention to flex, twist and spin reduces the opportunity for the pull member 108 to be unintentionally separated from the clip 106.

Figure 23:
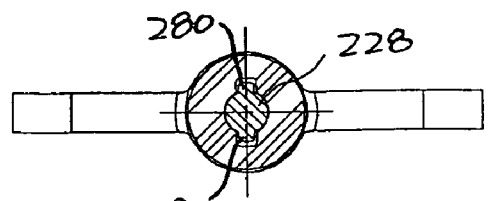
FIG. 23 is a sectional bottom view of the pull tab verifier assembly of FIG. 22.
Figure 22:
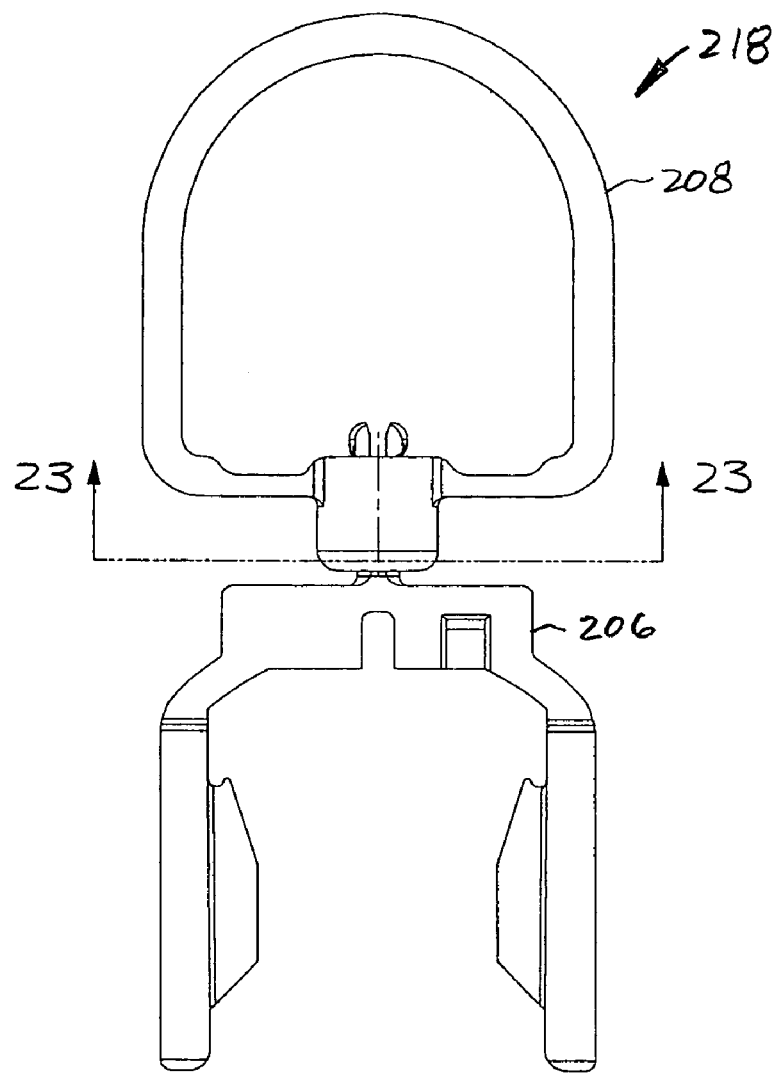
FIG. 22 is a rear view of a first alternative pull tab verifier assembly according to the present invention.

An alternative pull tab verifier assembly 218 in accordance to the present invention is illustrated in FIGS. 22 and 23. The alternative pull tab verifier assembly 218 is similar to the pull tab verifier assembly 18 with the exception that the clip and the pull member are keyed such that the pull member is always rotationally oriented at the same position relative to the clip. In certain quick connector coupling assembling processes, in particular fast moving automotive assembly lines, it may be desirable for all the pull members to be always rotationally oriented at the same position. This allows the assembly line worker to quickly grab the pull member to detach the pull tab verifier assembly from the connector body after the male member has been fully inserted into the connector body.

As illustrated in FIG. 22, the pull tab verifier assembly 218 includes a clip 206 and a separate pull member 208 connected or releasably secured to the clip 206. The clip 206 is illustrated in detail in FIGS. 24 and 25. The clip 206 includes a pair of elongated, generally parallel legs 210 extending from, and joined at one end, by a cross member 212. A cylindrical post 228, having finger portions 232, extends upward from the top of the cross member 212 and defines a slot 230 extending a distance, or length, downward from the top or free end of the post 228. The slot 230 allows the two elongated finger portions 232 of the post 228 to flex inward toward each other on application of radially inward force allowing the post 228 to define a smaller diameter. The post 228 includes a web 231, having a length significantly less than the length of the slot 230, connecting parts of finger portions 232 to each other. The web 231 concentrates the flexibility of the finger portions 232 toward each other.

The top of each finger portions 232 includes radially enlarged rim 234 extending radially outward from each finger portions 232. The top of the rim 234 defines a rounded upper engagement surface 237. The bottom of the rim 234 defines a rounded lower engagement surface 239. Alternatively, the upper engagement surface 237 and/or the lower engagement surface 239 can be tapered. The rounded or tapered shape of the upper engagement surface 237 allows a radially inward force to be created, flexing the finger portions 232 inward toward each other, when the post 228 is being inserted into a hole of the pull member 208. The rounded or tapered shape of the lower engagement surface 239 allows a radially inward force to be created, flexing the finger portions 232 inward toward each other, when a pulling force is exerted on the pull member 208. When the finger portions 232 are flexed toward each other, the perimeter around the rim 234 is smaller than the perimeter when no force is applied and permit the pull member 208 to separate from the clip 206.

The post 228 further includes two radially outward extending alignment tabs 280. The tabs 280 are located approximately 180° (degrees) apart and approximately in-line with the slot 230 of the post 228, when viewing the clip from the front or rear. Each tab 280 extends along the axis of the post from the upper surface of the cross member 212 to the slot 230 defined in the post, as illustrated in FIG. 24. The tab 280 includes a tapered lead-in surface 282 providing easy insertion of the tab 280 through an alignment notch defined in the pull member 208.

Figure 27:
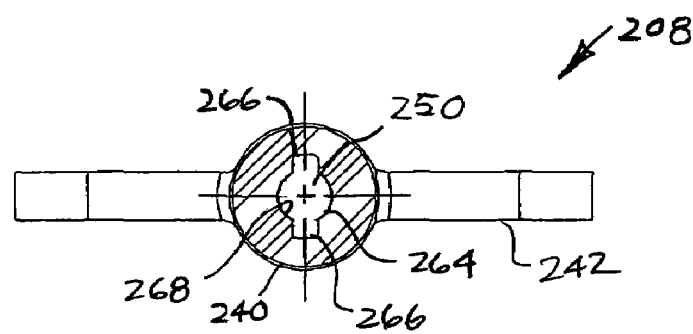
FIG. 27 is a sectional bottom view of the pull member of FIG. 26, taken along line 27-27.
Figure 26:
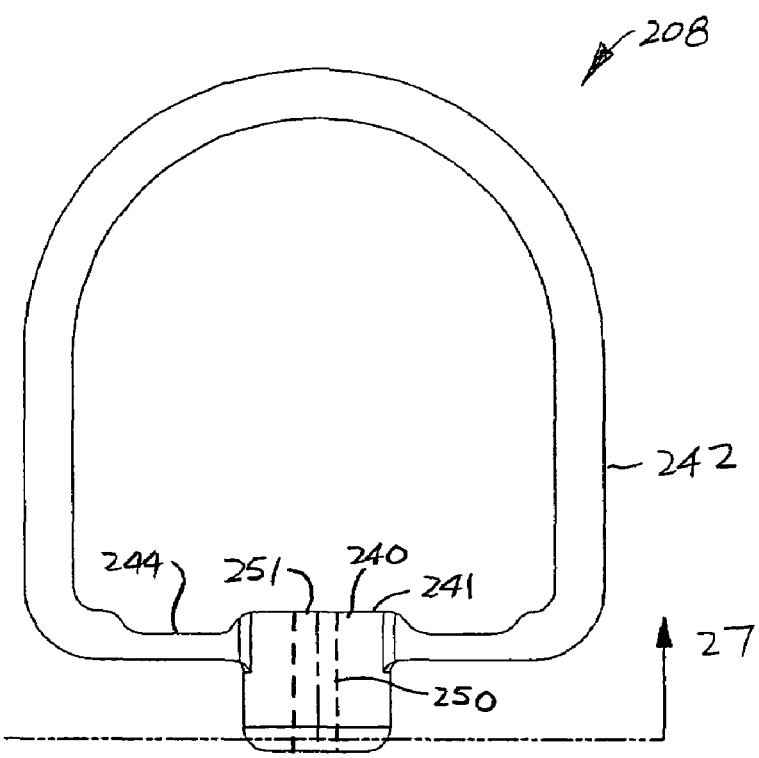
FIG. 26 is a rear view of a pull member of the pull tab verifier assembly of FIG. 22.

The pull member 208 is illustrated in detail in FIGS. 26 and 27. The pull member 208 is connected or releasably secured to the clip 206, such that if the pull member 208 is pulled with a force greater than what is necessary for the pull tab verifier assembly 218 to be pulled from the connector body 14 when the male member 12 is fully inserted into the female connector body 14, the pull member 208 will separate from the clip 206. The pull member 208 includes a base 240 and a ring 242 extending from the base 240. The base 240 defines a hole 250 extending downwardly from an opening 251 on the top surface 241 of the base 240. The hole 250 has a generally cylindrical bore 264 and two notches 266 radially outwardly of the cylindrical outline of the bore 264. In other words, two radially outward notches 266 are formed on the wall 268 defining the hole 250, which would have otherwise defined a smooth bore. The notches 266 are located approximately 180° (degrees) apart. The radial extent of the notches 266 is slight greater than the radial extent of the alignment tab 280. The width of the notches 266 is slightly greater than the width of the alignment tab 280. The cylindrical bore 264 of the hole 250 has a diameter smaller than the outer diameter of rim 234 of the post 228 when the two finger portions 232 of the post are in the un-flexed state, and the diameter of the cylindrical bore 264 of the hole 250 is larger than the outer diameter of the rim 234 when the two finger portions 232 of the post 228 are flexed inward.

The pull member 208 is secured to the clip 206 by inserting the post 228 of the clip 206 into the hole 250 defined in the base 240 of the pull member 208. In order to insert the post 228 into the hole 250, it is necessary to align the two alignment tabs of the post 128 with the two notches 266 of the hole 250. With the post 228 inserted into the hole 250, the alignment tabs 280 occupy the notches 266 of the hole 250, as shown in FIG. 23. This arrangement of the clip keyed with the pull member assures that each pull member 208 is rotational oriented in the desired position relative to the clip 206. The pull tab verifier assembly 218 of the exemplary embodiment is illustrated with the pull member 208 rotational oriented in a position that is in-line with the clip 206, such that the horizontal columns 244 of the pull member 208 are approximately in-line or parallel with the cross member 212 of the clip 206, when viewing the pull tab verifier assembly 218 from the top. It should be noted that it remains within the spirit of the present invention to rotational orient the pull member in a desired position other than in-line with the clip, which can be accomplished by forming the alignment tabs extending from the post at different locations. This arrangement the clip keyed with the pull member also assures that each pull member 208 is rotational oriented in the desired position relative to the connector body 14, after the pull tab verifier assembly 218 has been installed onto the connector body 14.

The pull tab verifier assembly 218 is installed onto the connector body 14 in the same manner as the pull tab verifier assembly 18 is installed onto the connector body 14, as previously described. The pull tab assembly 218 can also be detached from the connector body 14 by pulling on the tube pull tab verifier assembly 218, upon the male member 12 fully connected the with the female connector 14, in the same manner as the pull tab verifier assembly 18 can be detached from the connector body 14, as previously described. Similarly, the pull tab verifier assembly 218 would separate should the pull member 208 of the pull tab verifier assembly 218 be pulled with a force greater than the force necessary to disengage the pull tab verifier assembly 218 from the connector body 14 when the male member 12 has been fully inserted into the connector body 14, in the same manner as pull member 108 of the pull tab verifier assembly 18 separates from the clip 106, as previously described.

A second alternative pull tab verifier assembly 318 in accordance to the present invention is illustrated in FIGS. 28-30. The second alternative pull tab verifier assembly 318 is similar to the pull tab verifier assembly 18 and the first alternative pull tab verifier assembly 218 with the exception that the post of the clip fractures or breaks should the pull member of the pull tab verifier assembly 318 be pulled with a force greater than the force necessary to disengage the pull tab verifier assembly 318 from the connector body 14 when the male member 12 has been fully inserted into the female connector body 14.

The pull tab verifier assembly 318 includes a clip 306 and a separate pull member 208 connected or secured to the clip 306. The pull member 208 of the pull tab verifier assembly 318 is the same as the pull member 208 of the pull tab verifier assembly 218. The clip 306 is illustrated in detail in FIG. 28. The clip 306 includes a pair of elongated, generally parallel legs 310 extending from, and joined at one end, by a cross member 312. A cylindrical post 328, having finger portions 332, extends upward from the top of the cross member 312 and defines a slot 330 extending a distance, or length, downward from the top end of the post 328. The slot 330 allows the two elongated finger portions 332 of the post 328 to flex inward toward each other on application of radially inward force allowing the post 328 to define a smaller diameter. The post 228 includes a web 331, having a length significantly less than the length of the slot 330, connecting parts of finger portions 332 to each other. The web 331 concentrates the flexibility of the finger portions 332 toward each other.

The top of each finger portions 332 includes radially enlarged rim 334 extending radially outward from each finger portions 332. The top of the rim 334 defines a rounded upper engagement surface 337. The upper engagement surface 337 may also be tapered. The rounded or tapered shape of the upper engagement surface 337 allows a radially inward force to be created, flexing the finger portions 332 inward toward each other, when the post 328 is being inserted into the hole 250 of the pull member 208. The bottom of the rim 334 defines an annular lower abutment or engagement surface 339. The plane defined by the annular lower engagement surface 339 is approximately perpendicular to the axis of post 328. The post 328 further includes two radially outward extending alignment tabs 380. Each tab 380 extends along the axis of the post from the upper surface of the cross member 312 to the slot 330 defined in the post.

The pull member 208 is secured to the clip 306 in the same manner as the pull member 208 is secured to the clip 206 of the pull tab verifier assembly 218, as previously described. The pull tab verifier assembly 318 is installed onto the connector body 14 in the same manner as the pull tab verifier assembly 18 is installed onto the connector body 14, as previously described. The pull tab assembly 318 can also be detached from the connector body 14 by pulling on the tube pull tab verifier assembly 318, upon the male member 12 fully connected the with the female connector 14, in the same manner as the pull tab verifier assembly 18 can be detached from the connector body 14, as previously described.

If the male member 12 has not been fully inserted into the female connector body 14, such that the male member 12 has not been sufficiently inserted axially inward into the connector body 14 to allow the upset 22 to surpass the free ends of the retention beams 100 of the retainer 16, the hooks 126 of the pull tab verifier assembly 318 remain immediately below and engaged with the corresponding seats 59, as illustrated in FIG. 30. When a pulling force is exerted on the pull member 208, annular engagement surface 339 of the post 328 abuts the top surface 241 of the base 240 preventing the post 328 from sliding through the hole 250 of the pull handle 208. Should the pull member 208 of the pull tab verifier assembly 318 be pulled with a force greater than the force necessary to disengage the pull tab verifier assembly 318 from the connector body 14 when the male member 12 has been fully inserted into the female connector body 14, the pulling force fractures or breaks the fingers 332 of the post 328 at a location below the rim 334, separating the pull member 208 from the broken clip 306. The pull member 208 may also separate from the clip 306 by stripping or breaking off only the radially enlarged portion of the rim 334 such that the stripped rim 334 has a diameter smaller than the diameter of the hole 250 of the pull member 208. The way the pull tab verifier assembly 318 separates is very different from the way the pull tab verifier assembly 18 separates and the way the pull tab verifier assembly 218 separates. The pull tab verifier assembly 318 separates by breaking or stripping the post 328, whereby, the post 328 is permanently damaged during the separation process. Hence, the clip 306 and the pull member 208 can not be reattached after the pull tab verifier assembly 318 separates. The pull tab verifier assembly 318 can be used in applications where it is not desirable or not necessary to reattach the pull member 208 to the clip 306 after the pull tab verifier assembly 318 separates.

Various features of the present invention have been explained with reference to the embodiment shown and described. It should be understood, however, that modification may be made without departing from the spirit and scope of the invention as represented by the following claims.

I claim:

1. A quick connector coupling comprising:
   a hollow connector body;
   a male member received in said connector body and having an enlarged annular upset;
   a tube insertion verifier assembly including a clip and a separate pull member releasably connected to said clip, said clip including two legs releasably engaging said connector body, said upset of said male member contacting said legs to flex said legs outward when said male member is fully inserted into the connector body to permit said clip to disengage from the connector body upon a pulling force being exerted on said pull member, said pull member separating from said clip upon a pulling force being exerted on the pull member when the male member is not fully inserted into the connector body.

2. The quick connector coupling as claimed in claim 1 wherein said legs include latches having hooks directed toward each other, said hooks engage said connector body when the male member is not fully inserted into the connector body.

3. The quick connector coupling as claimed in claim 1 wherein said clip includes a post, said pull member includes a hole and is slidably mounted on said post allowing said pull member to be connected to said clip.

4. The quick connector coupling as claimed in claim 3 wherein said pull member is able to rotate relative to said post.

5. The quick connector coupling as claimed in claim 3 wherein said post includes two elongated and spaced apart finger portions and defines a slot in between said two finger portions, said two finger portions of said post flex toward each other permitting said pull member to separate from said clip if a pulling force is exerted on the pull member when the male member is not fully inserted into the connector body.

6. The quick connector coupling as claimed in claim 3 wherein said post includes a radially enlarged rim at the end of said post.

7. The quick connector coupling as claimed in claim 6 wherein said radially enlarged rim has a rounded upper surface.

8. The quick connector coupling as claimed in claim 6 wherein said radially enlarged rim has a rounded lower surface.

9. The quick connector coupling as claimed in claim 6 wherein said radially enlarged rim has an annular lower surface.

10. The quick connector coupling as claimed in claim 3 wherein said post includes two elongated and spaced apart finger portions and defines a slot in between said two finger portions, said finger portions of said post break permitting said pull member to separate from said clip if a pulling force is exerted on the pull member when the male member is not fully inserted into the connector body.

11. The quick connector coupling as claimed in claim 3 wherein the rotational orientation of said pull member relative to said clip is fixed.

12. The quick connector coupling as claimed in claim 11 wherein said post of said clip includes an alignment tab and wherein said hole of said pull member has a notch for receiving said alignment tab to fix the rotational orientation of said pull member relative to said clip.

13. The quick connector coupling as claimed in claim 3 wherein said post of said clip includes an alignment tab and wherein said hole of said pull member has a notch for receiving said alignment tab.

14. The quick connector coupling as claimed in claim 13 wherein said post of said clip includes a second alignment tab and wherein said hole of said pull member has a second notch for receiving said second alignment tab.

15. The quick connector coupling as claimed in claim 3 wherein said pull member includes a base, said hole extends through said base and receives said post of said clip.

16. The quick connector coupling as claimed in claim 1 wherein each of said legs includes a latch having a ramped lead surface.

17. The quick connector coupling as claimed in claim 1 wherein said clip includes a cross member joining said legs.

18. The quick connector coupling as claimed in claim 17 wherein said cross member is located radially outward of said connector body.

19. The quick connector coupling as claimed in claim 17 wherein said connector body includes a protrusion extending from said connector body and wherein said cross member defines a notch for receiving said protrusion.

20. The quick connector coupling as claimed in claim 17 wherein said connector body has a bore extending from an entrance and includes a protrusion extending from the outer surface of said connector body, said cross member includes a tab offset toward one of said legs, each of said legs includes a latch having a ramped lead surface, said tab contacts said protrusion upon a radially inward movement of said verifier assembly toward said connector body when said ramped lead surface is facing away from said entrance of said connector body.

21. The quick connector coupling as claimed in claim 17 wherein said connector body has a bore extending from an entrance and includes a protrusion extending from the outer surface of said connector body, said cross member includes a tab offset toward one of said legs, each of said legs includes a latch having a ramped lead surface, said tab is spaced apart from said protrusion when said legs of said clip are releasably engaging said connector body and when said ramped lead surface is facing said entrance of said connector body.

22. The quick connector coupling as claimed in claim 1 wherein said connector body includes a rear guide rim and a front guide rim, said rear guide rim and said front guide rim define a pull tab guide slot for receiving one of said legs of said clip.

23. The quick connector coupling as claimed in claim 22 wherein said connector body includes a second rear guide rim and a second front guide rim, said second rear guide rim and said second front guide rim define a second pull tab guide slot for receiving other of said legs of said clip.

24. The quick connector coupling as claimed in claim 1 wherein said connector body defines two windows circumferentially spaced apart approximately one-hundred and eighty degrees.

25. The quick connector coupling as claimed in claim 24 wherein each of said legs of said clip includes a latch extending through one of said windows.

26. The quick connector coupling as claimed in claim 1 wherein said pull member includes a ring having a horizontal column and a vertical column, the thickness of said horizontal column is less than the thickness of said vertical column.

27. The quick connector coupling as claimed in claim 1 further comprises a retainer disposed in said connector body to secure said male member in said connector body.

28. The quick connector coupling as claimed in claim 27 wherein said retainer includes retention beams extending between said upset and said connector body to secure said male member in said connector body.

29. A quick connector coupling comprising:
a connector body having a bore extending from an entrance of said connector body, the connector body includes a protrusion extending from the outer surface of the connector body;
a male member extending through said entrance of said connector body and into said connector housing;
a verifier assembly having two legs and a cross member joining said legs, said cross member includes a tab offset toward one of said legs, each of said legs includes a latch having a ramped lead surface, said tab contacts said protrusion upon a radially inward movement of said verifier assembly toward said connector body when said ramped lead surface is facing away from said entrance of said connector body and said tab is spaced apart from said protrusion when said legs of said clip are releasably engaging said connector body and said ramped lead surface is facing said entrance of said connector body.

30. The quick connector coupling as claimed in claim 29 wherein said tab is adjacent to said protrusion when said legs of said clip are releasably engaging said connector body and said ramped lead surface is facing said entrance of said connector body.

31. The quick connector coupling as claimed in claim 29 wherein said protrusion has an outer surface, said tab contacts said outer surface of said protrusion when said ramped lead surface is facing away from said entrance of said connector body.

32. The quick connector coupling as claimed in claim 29 wherein said protrusion includes a full lateral beam portion and a truncated lateral beam portion, said cross member is situated between said full lateral beam portion and said truncated lateral beam portion when said legs of said clip are releasable engaging said connector body.

33. The quick connector coupling as claimed in claim 32 wherein said tab contacts said full lateral beam portion upon a radially inward movement of said verifier assembly toward said connector body when said ramped lead surface is facing away from said entrance of said connector body.

34. The quick connector coupling as claimed in claim 32 wherein said tab is spaced apart from said truncated lateral beam portion when said legs of said clip are releasably engaging said connector body and when said ramped lead surface is facing said entrance of said connector body.

35. The quick connector coupling as claimed in claim 34 wherein said tab is adjacent to said truncated lateral beam portion when said legs of said clip are releasably engaging said connector body and said ramped lead surface is facing said entrance of said connector body.

36. The quick connector coupling as claimed in claim 32 wherein said protrusion further includes a central beam portion and wherein said cross member further defines a notch receiving said central beam portion when said legs of said clip are releasably engaging said connector body.

37. The quick connector coupling as claimed in claim 29 wherein said male member has an enlarged annular upset contacting said legs to flex said legs outward when said male member is fully inserted into the connector body to permit said clip to disengage from the connector body if a pulling force is exerted on the pull member.

38. The quick connector coupling as claimed in claim 29 wherein said cross member is located radially outward of said connector body.

39. The quick connector coupling as claimed in claim 29 wherein said connector body includes a rear guide rim and a front guide rim, said rear guide rim and said front guide rim define a pull tab guide slot for receiving one of said legs of said clip.

40. The quick connector coupling as claimed in claim 39 wherein said connector body includes a second rear guide rim and a second front guide rim, said second rear guide rim and said second front guide rim define a second pull tab guide slot for receiving other of said legs of said clip.

41. The quick connector coupling as claimed in claim 29 wherein said legs have forward facing surfaces and wherein each of said latches has a planar surface approximately parallel to a plane defined by said forward facing surfaces of said legs, said tab contacts said protrusion upon a radially inward movement of said verifier assembly toward said connector body when said planar surface is facing said entrance of said connector body.

42. The quick connector coupling as claimed in claim 41 wherein said tab is spaced apart from said protrusion when said legs of said clip are releasably engaging said connector body and when said ramped lead surface is facing away from said entrance of said connector body.

43. A method of making a quick connector coupling comprising the steps of:
   a) providing a male member having an enlarged annular upset;
   b) providing a hollow connector body;
   c) providing a tube insertion verifier assembly including a clip and a pull member connected to said clip;
   d) engaging said tube insertion verifier with said connector body;
   e) inserting said male member into said connector body to a position in which said annular upset is spaced from said clip;
   f) exerting a pulling force on said pull member with said annular upset of said male member spaced from said clip;
   g) separating said pull member from said clip; and
   h) reattaching said pull member to said clip.

44. The method as claimed in claim 43 further comprising the steps of moving said male member to a position in which said annular upset contacts said clip, exerting a pulling force on said pull member with said annular upset contacting said clip, and disengaging said clip from said connector body.

45. The method as claimed in claim 43 wherein said clip includes two legs, said step of moving said male member to a position in which said annular upset contacts said clip comprises flexing said legs outward.

46. The method as claimed in claim 43 wherein said clip includes a post and said pull member includes a hole, said step of reattaching said pull member to said clip comprises inserting said post of said clip through said hole of said pull member.

47. The method as claimed in claim 46 wherein said post includes two elongated and spaced apart finger portions, said step of reattaching said pull member to said clip further comprises flexing said two finger portions of said post toward each other.

48. The method as claimed in claim 43 wherein said clip includes a post and said pull member includes a hole, said step of separating said pull member from said clip comprises withdrawing said post of said clip from said hole said pull member.

49. The method as claimed in claim 48 wherein said post includes two elongated and spaced apart finger portions, said step of separating said pull member from said clip further comprises flexing said two finger portions of said post toward each other.

\* \* \* \* \*